H. L. NEWTON.
SPRING WHEEL.
APPLICATION FILED NOV. 5, 1917.
1,362,891. Patented Dec. 21, 1920.
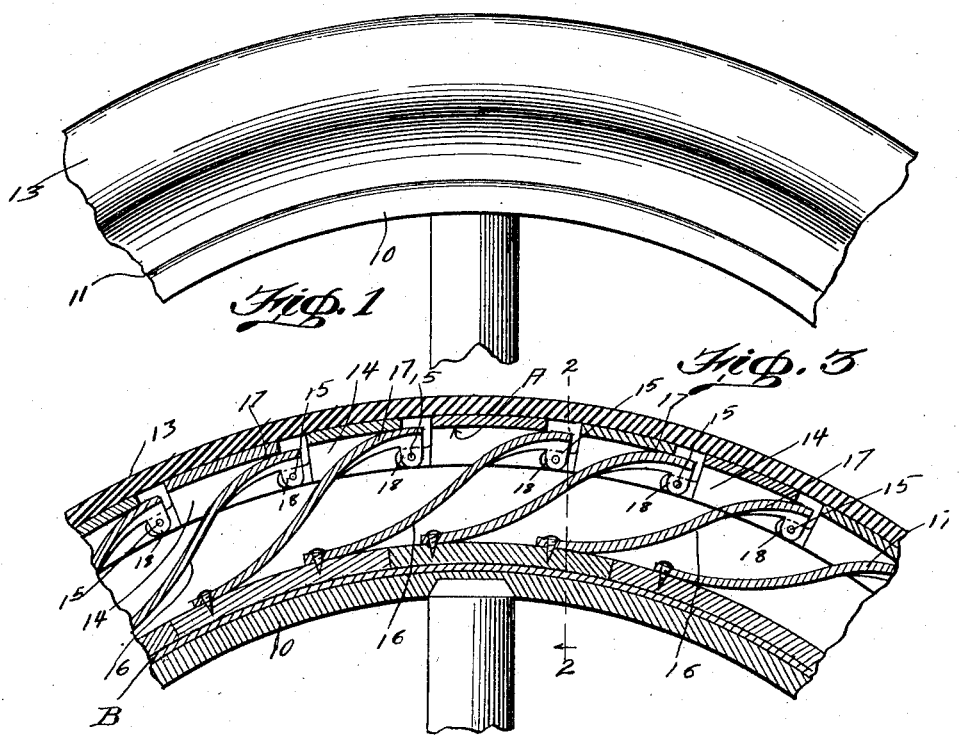
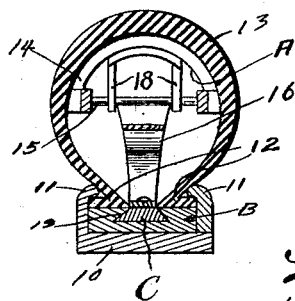
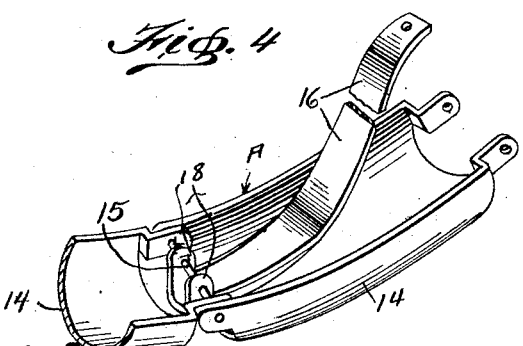
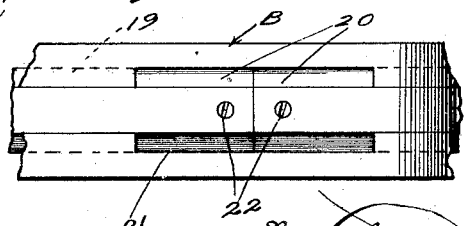
Inventor
H. L. Newton
Attorneys

UNITED STATES PATENT OFFICE.

HARRIE L. NEWTON, OF LINDEN, WISCONSIN, ASSIGNOR OF ONE-EIGHTH TO BRYON ALTON, OF LINDEN, WISCONSIN.

SPRING-WHEEL.

1,362,891. Specification of Letters Patent. Patented Dec. 21, 1920.

Application filed November 5, 1917. Serial No. 200,342.

*To all whom it may concern:*

Be it known that I, HARRIE L. NEWTON, a citizen of the United States, residing at Linden, in the county of Iowa, State of Wisconsin, have invented certain new and useful Improvements in Spring-Wheels; and I do hereby declare the following to be a full, clear, and exact description of the invention, such as will enable others skilled in the art to which it appertains to make and use the same.

This invention relates to improvements in wheels and particularly to vehicle wheels.

One object of the present invention is to provide a novel and improved device of this character whereby a novel arrangement of springs is substituted for the inner pneumatic tube of the common tire.

Another object of the present invention is to provide a device of this character which is so constructed that the same is capable of being placed inside the shoe or casing of the tire and is held from creeping around the tire.

Other objects and advantages will be apparent from the following description when taken in connection with the accompanying drawing.

In the drawing:

Figure 1 is a side elevation of a portion of a wheel made in accordance with my invention.

Fig. 2 is a vertical transverse sectional view taken on the line 2—2 of Fig. 1.

Fig. 3 is a vertical longitudinal sectional view through the tire and rim of the wheel.

Fig. 4 is a perspective view of portions of two of the sections of the band with the attached spring.

Fig. 5 is a plan view of a portion of the grooved ring and two of the abutting sections engaged therein.

Referring particularly to the accompanying drawing, 10 represents a rim which is slightly deeper than those ordinarily used on automobile wheels for the reception of the tires. The edges of the sides of the rim are turned inwardly, as at 11, for engagement with the clencher portions 12 of the tire shoe or casing 13. Disposed within the casing 13 and bearing against the inner face of the tread portion thereof, is a band A, formed of a plurality of sections 14, said sections being arcuate in cross section and pivotally connected together by means of the transverse bolts 15, whereby an endless ring or band is formed. Secured to the outer peripheral face of the rim, and in the bottom of the channel thereof, is a ring B in which is formed a longitudinally extending undercut or dove-tailed groove 19. Removably disposed in this groove are the sections 20 of a ring C to each of which sections are secured the inner ends of a pair of leaf springs 16, the outer end portions being wider than the attached portions and concavo-convex in cross section, as shown at 17. At one point in this ring B there is formed an opening 21 of a length slightly greater than that of one of the sections 20, whereby each of said sections may be quickly and easily placed in the groove and slipped under the overhanging side edges thereof. After the sections have been placed in the groove through the opening, and slipped around the ring, two of said sections are disposed with their abutting ends midway of the length of the opening 21, and screws 22 engaged through said ends and into the ring B to hold all of said sections against any creeping tendency around the wheel. Each of these springs has a pair of apertured lugs 18 on the sides of the outer end, and through these lugs the pivot bolt of two of the adjacent sections 14 is disposed. Thus the ring or band A is held against any creeping movement around the tire. The ring or band A, and the ring C, together with the springs, form a part of the wheel over which the tire casing is adapted to be placed and the clencher portions engaged with the inturned portions 11 of the rim. This forms a stiff but resilient device which has many of the advantages of the pneumatic tire but does away with the disadvantage of the puncturing feature of the pneumatic tire which is so annoying and costly to the automobile owner.

What is claimed is:

The combination with a wheel rim having means for engaging a tire casing, and sections removably mounted around said rim; of leaf springs secured at their inner ends to said sections respectively and extending thence outward substantially on tangential lines, each spring having a pair of inturned ears at the outer end, a plurality of outer sections engaged against the inner face of the tire casing and having overlapping portions at their mutually adjacent ends, and pivot bolts engaged through said overlapping portions and through the ears of the springs.

In testimony whereof, I affix my signature in the presence of two witnesses.

HARRIE L. NEWTON.

Witnesses:
 WM. BEENTHINKER,
 W. B. KIRKPATRICK.